Dec. 30, 1930.  F. B. RICKENBERG  1,787,212
VALVE
Filed April 2, 1929
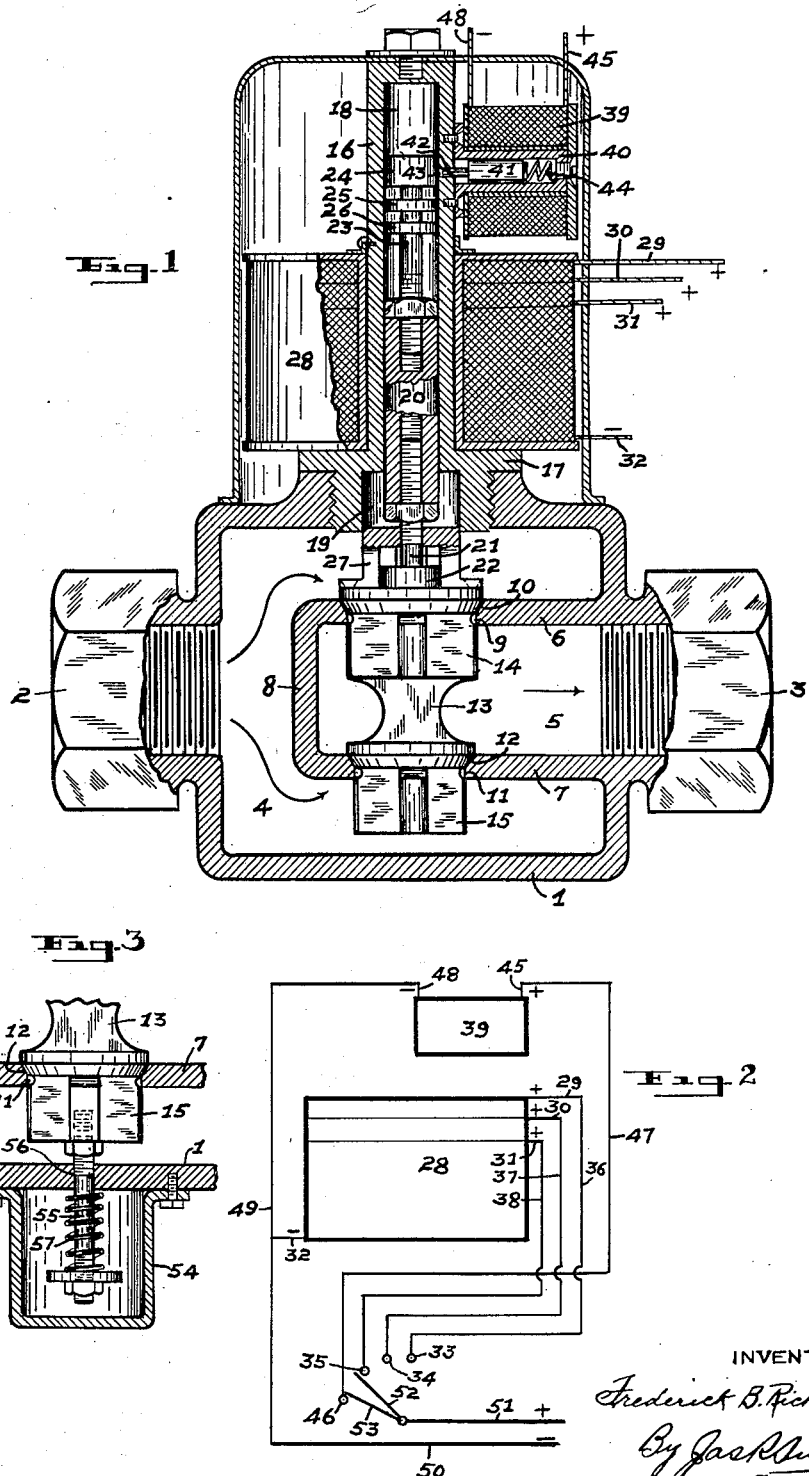
INVENTOR
Frederick B. Rickenberg
By Jack Snyder
Attorney Patented Dec. 30, 1930

1,787,212

UNITED STATES PATENT OFFICE

FREDERICK B. RICKENBERG, OF PITTSBURGH, PENNSYLVANIA

VALVE

Application filed April 2, 1929. Serial No. 351,908.

My invention relates to improvements in valves somewhat of the type disclosed in my co-pending application for Letters Patent of the United States, bearing filing date the 28th day of April, 1928, and Serial No. 273,703.

The primary object of the invention is to provide a valve of the character described which is electro-magnetically regulated and controlled, thereby providing a device that is particularly adaptable for remote control, and for continuous, automatic or intermittent operations.

Further objects of the invention are to provide a device of the class stated, which embodies a balanced valve member, which is simple in its construction and arrangement, strong, durable and efficient in its use, compact, positive in its action and comparatively inexpensive to manufacture, operate and maintain.

To the accomplishment of these and such other objects as may hereinafter appear, the invention consists of the novel construction, combination and arrangement of parts herein specifically described and illustrated in the accompanying drawing, but it is to be understood that changes in the precise embodiment of the invention herein described can be made within the scope of what is claimed without departing from the spirit of the invention.

In the drawing wherein like numerals of reference designate corresponding parts throughout the several views:—

Figure 1 is a vertical cross sectional view of an electro-magnetically operated valve constructed in accordance with the invention.

Figure 2 is a diagrammatic view of the wiring arrangement involved in the operation of the shown embodiment of my improved valve.

Figure 3 is a cross sectional view of a valve closing element, and of associated parts.

Referring in detail to the drawing 1 denotes a valve casing having internally threaded open ends 2 and 3, permitting of the connection of the device in associated conduits. The interior of the casing provides a main inlet chamber 4 and an outlet chamber 5. The latter is formed by spaced upper and lower walls, respectively indicated at 6 and 7, which have their inner ends joined together by an end wall 8. The inlet chamber 4 communicates with the open inlet end 2, and the outlet chamber 5 communicates with the open outlet end 3.

A valve opening 9, formed with a valve seat 10, is provided in the upper wall 6, and a valve opening 11, formed with a valve seat 12, is provided in lower wall 7. The valve openings 9 and 11 establish communication between the inlet chamber 4 and the outlet chamber 5, and are vertically aligned relatively to each other. The valve opening 9 is slightly larger than the valve opening 11 to permit of the positioning of the dual valve element 13 therethrough.

The valve element 13 comprises a pair of rigidly joined, vertically aligned, valve members 14 and 15. The valve member 14 seats in the valve seat 10, and the valve member 15 seats in the valve seat 12. The vertical movement of the valve element 13 controls the valve openings 9 and 11 and the flow or passage of any fluid through said openings.

A vertically disposed, tubular stem 16, having an enlarged lower end 17, is threadedly mounted in the top wall of the valve casing 1. The stem 16 is provided with a bore 18, which is closed at its upper end and formed with an enlarged bore portion 19, at its lower end, to provide clearance for the valve element 13 when the latter is shifting to the opening position.

A soft iron plunger 20 is mounted for slidable vertical movement in the stem bore 18. A connecting bolt 21, provided with a head 22, is adjustably secured to the lower end of the plunger 20. A stop bolt 23, provided with three spaced annular heads, respectively indicated at 24, 25 and 26, is adjustably secured to the upper end of the plunger 20 within the stem bore 18.

The connecting bolt 21 depends into a connecting yoke 27, which is secured to the top of the upper valve member 14. The bolt head 22 is disposed in the yoke 27 with clearance, permitting some vertical movement in the latter, to provide an impact or impetus facilitating the vertical opening movement of the valve element 13 in the manner to be described.

A main solenoid 28 surrounds the stem 16 and is securely mounted on the enlarged lower end 17, of the latter. The main solenoid 28 is wound to provide three stage action, and is consequently provided with three positive terminals, respectively indicated at 29, 30 and 31, and one negative terminal 32.

As clearly shown in the wiring diagram in Figure 2, the positive terminals 29, 30 and 31, are connected with respective switch contacts 33, 34 and 35, by respective conductors 36, 37 and 38. The negative terminal 32 connects with a conductor 49.

A stop solenoid 39, provided with a tubular support 40, is fixed to one side of the stem 16 above the main solenoid 28. A plunger 41, carrying a reduced stop pin 42 at its inner end, is slidably mounted for horizontal movement in the tubular support 40.

The stop pin 42 projects into an aperture 43 formed in the stem 16. A spiral spring 44 is mounted in the tubular support 40 and abuts against the plunger 41. The normal action of the spring 44 forces the plunger 41 inwardly to project the stop pin 42 through the stem aperture 43. The stop pin 42 is adapted for engaging the lower sides of respective bolt heads 24, 25 and 26 for maintaining the valve element 13 in its open position, in a manner hereinafter described. A suitable cover member 58 fixed to the top of the stem 16 by a screw bolt 59, completely encloses and protects the solenoids 28 and 39.

The positive terminal 45, of the stop solenoid 39, is connected with the switch contact 46, by a conductor 47, and the negative terminal 48, connects with the conductor 49, which connects with the negative main electrical conductor 50. The positive main electrical conductor 51 connects with the control switches 52 and 53. The switch 52 controls the operation of the main solenoid 28, and the switch 53 controls the operation of the stop solenoid 39.

Figure 3 illustrates a valve closing element, which need only be embodied in my improved valve structure if required, particularly when the latter is positioned in some other than its normal vertical position. The closing element comprises a cup 54, which is fixed to the lower side of the valve casing 1. A bolt 55 is adjustably secured in the lower end of the lower valve member 15 and slidably projects through an aperture 56, formed in the casing 1, and into the cup 54. A spiral spring 57 is adjustably mounted on the projecting end of the bolt 55, within the cup 54, and normally acts to draw the valve element to the closing position.

In practice the operation of my improved valve is as follows:—When all parts of the device are in the positions shown in Figure 1, the valve element 13 is in the closing position. In opening the valve, the switch 53 is first operated to contact with the switch 46, whereby the stop solenoid 39 is energized to maintain the stop pin 42 in its retracted or releasing position. The switch 52 is now operated to contact with the switch contact 35 to energize the main solenoid 28 to provide the low stage action of the latter. The plunger 20 is so adjusted between the bolts 21 and 23 that the low stage energization of the solenoid 28 will provide a line of attraction partially elevating the plunger 20 and the valve element 13 connected with the latter. This position of the plunger 20 will place the bolt head 24 in position for engagement, on its under side by the stop pin 42. By now de-energizing the solenoid 39, the action of the spring 44 will force the stop pin 42 into engagement with the head 24 and maintain the valve element 13 in the partially open position, and permitting of the de-energization of the solenoid 28.

To further open the valve, the solenoid 39 is again energized to retract the stop pin 42, and the switch 52 is operated to contact with either of the switch contacts 34 or 35 to provide either the medium or high stage action, respectively, of the solenoid 28, whereby the valve element 13 will be elevated to position respective heads 25 or 26 for engagement by the stop pin 42 when the solenoid 39 is de-energized. It will be seen that it is necessary to first energize the solenoid 39 to release the stop pin 42 before the valve element 13 can be operated, but after the latter has been shifted to its desired position by the action of the solenoid 28, in the manner stated, the de-energization of the solenoid 39 will allow the automatic engagement of the stop pin 42 with respective heads 24, 25 and 26 and hold the valve element 13 in its proper opening positions, and permit of the de-energization of the solenoid 28.

To close the valve it is only necessary to de-energize the solenoid 39 to detract the stop pin 42, thereby allowing the valve element 13 to drop by gravity to the closing position. In the event that the device is not positioned to allow such gravity closing action, the provision of the device illustrated in Figure 3, will effect the closing action. After the closing operation, the solenoid 39, is of course de-energized.

While providing a three stage action solenoid 28 in the embodiment herein disclosed, it will be obvious that the main solenoid 28 may be constructed or wound to provide any desired number of such actions to best meet conditions found in practice.

The dual construction of the valve element 13 as herein illustrated and described, is preferably of the single type, as it reduces the distance of its travel in effecting the regulation of the valve desired. It will be further noted that the construction and arrangement of the valve element 13 balances the latter to equalize the fluid pressure against same, whereby but a small amount of power is required to effect its opening operation. The opening operation of the valve element 13 is further facilitated by the impetus of the bolt head 22 in the yoke 27 at the start of each opening operation.

The present invention provides a most efficient electrically operated valve, which may be economically constructed to provide positive and accurate regulation.

What I claim is:

1. In combination, a valve comprising a valve casing, a valve element mounted in said valve casing and shiftable in the latter for opening and closing the valve, a stem provided with a bore and detachably secured to said valve casing, said bore having a closed outer end and an enlarged inner end communicating with said valve casing, a plunger shiftably mounted in said bore, a connecting bolt adjustably connected with said plunger and having a shiftable connection with said valve element, and an electro-magnet mounted on said stem and operable for actuating said plunger to shift said valve element to the opening position in said valve casing, said enlarged bore end providing clearance for said valve element when the latter is shifting to the opening position.

2. In combination, a valve comprising a valve casing, a valve element mounted in said valve casing and shiftable in the latter for opening and closing the valve, a stem provided with a bore, and detachably secured to said valve casing, said bore having a closed outer end and enlarged inner end communicating with said valve casing, a plunger shiftably mounted in said bore, a connecting bolt adjustably connected with said plunger and having a shiftable connection with said valve element, an electro-magnet mounted on said stem and operable for actuating said plunger to shift said valve element to the opening position in said valve casing, said enlarged bore end providing clearance for said valve element when the later is shifting to the opening position, a stop bolt mounted in said bore and having an adjustable connection with the outer end of said plunger, and electro-magnetically operated means extending through said stem into said bore and engaging said stop bolt for maintaining said valve element in the open position.

3. In combination, a valve comprising a valve casing, a valve element mounted in said valve casing and shiftable in the latter for opening and closing the valve, a stem provided with a bore, and detachably secured to said valve casing, said bore having a closed outer end and an enlarged inner end communicating with said valve casing, a plunger shiftably mounted in said bore, a connecting bolt adjustably connected with said plunger and having a shiftable connection with said valve element, and an electro-magnet mounted on said stem and operable for actuating said plunger to shift said valve element to various open positions, said enlarged bore end providing clearance for said valve element when the latter is shifting to the opening position.

4. In combination, a valve comprising a valve casing, a valve element mounted in said valve casing and shiftable in the latter for opening and closing the valve, a stem provided with a bore and detachably secured to said valve casing, said bore having a closed outer end and an enlarged inner end communicating with said valve casing, a plunger shiftably mounted in said bore, a connecting bolt adjustably connected with said plunger and having a shiftable connection with said valve element, an electro-magnet mounted on said stem and operable for actuating said plunger to shift said valve element to various open positions, said enlarged bore end providing clearance for said valve element when the latter is shifting to the opening position, a stop bolt mounted in said bore and having an adjustable connection with said plunger, said stop bolt being provided with a plurality of annular heads, and electro-magnetically operated means extending through said stem into said bore and engaging with one of said annular heads for maintaining said valve element in its respective open position.

5. In combination, a valve comprising a valve casing, a valve element mounted in said valve casing and shiftable in the latter for opening and closing the valve, a stem provided with a bore and detachably secured to said valve casing, said bore having a closed outer end and an enlarged inner end communicating with said valve casing, a plunger shiftably mounted in said bore, a connecting bolt adjustably connected with said plunger and having a shiftable connection with said valve element, an electro-magnet mounted on said stem and operable for actuating said plunger to shift said valve element to various open positions, said enlarged bore end providing clearance for said valve element when the latter is shifting to the opening position, a stop bolt mounted in said bore and having an adjustable connection with said plunger, said stop bolt being provided with a plurality of annular heads, and electro-magnetically operated means extending through said stem into said bore and engaging with one of said annular heads for maintaining said valve element in its respective open positions, and means adjustably connecting with the inner end of said valve element for returning the latter to its closing position.

In testimony whereof I affix my signature.

FREDERICK B. RICKENBERG.